United States Patent [19]

Lingemann et al.

[11] Patent Number: 4,903,131
[45] Date of Patent: Feb. 20, 1990

[54] METHOD FOR THE AUTOMATIC CORRECTION OF ERRORS IN IMAGE REGISTRATION DURING FILM SCANNING

[75] Inventors: Karl-Heinz Lingemann, Pfungstadt; Dieter Poetsch; Volker Massmann, both of Ober-Ramstadt, all of Fed. Rep. of Germany

[73] Assignee: BTS Broadcast Television Systems GmbH, Darmstadt, Fed. Rep. of Germany

[21] Appl. No.: 264,636

[22] Filed: Oct. 31, 1988

[30] Foreign Application Priority Data

Oct. 30, 1987 [DE] Fed. Rep. of Germany ....... 3736790

[51] Int. Cl.⁴ ............................................ H04N 5/253
[52] U.S. Cl. .................................... 358/214; 358/222
[58] Field of Search ................. 358/214, 215, 216, 54, 358/222

[56] References Cited

U.S. PATENT DOCUMENTS

| 4,104,680 | 8/1978 | Holland | 358/132 |
|---|---|---|---|
| 4,151,560 | 4/1979 | Zinchuk | 358/214 |
| 4,476,493 | 10/1984 | Poetsch et al. | 358/214 |
| 4,513,324 | 4/1985 | Poetsch et al. | 358/214 |
| 4,630,120 | 12/1986 | Childs | 358/214 |
| 4,717,958 | 1/1988 | Gal et al. | 358/222 |
| 4,814,885 | 3/1989 | Beard | 358/214 |

FOREIGN PATENT DOCUMENTS 0162486 11/1985 European Pat. Off. .
1412128 8/1973 United Kingdom .
1466273 3/1977 United Kingdom .
2145899 4/1985 United Kingdom .
2165417 4/1986 United Kingdom .

OTHER PUBLICATIONS

Image Unsteadiness in 16 mm Film for TV-by Wood et al., vol. 80, Oct. 1971-Journal of the SMPTE.
Challenges to the Concept of Cancellation-Zavada-pp. 1173-1183-Dec. 1981-SMPTE Journal.
New Investigations on Picture Steadiness of Motion Pictures in Projection-Karl-Otto Frielinghaus-1/19-68-SMPTE Journal-vol. 77.

*Primary Examiner*—Jin F. Ng
*Assistant Examiner*—Stephen Brinich
*Attorney, Agent, or Firm*—Felfe & Lynch

[57] ABSTRACT

A method is described for the determination and automatic correction of horizontal and vertical errors in image steadiness for continuous raster scanning of film, using an image memory. By means of the vertical image steadiness error signals the beginning of scanning of the first line of a new film frame and the start of writing of video signals for the first line of this film frame are determined. Output of the video signals for at least one stored image is synchronous with the studio timing signals so that it can be read out using standard studio horizontal image steadiness and vertical timing signals. By means of the horizontal error signals the start of the scanning of a new line is displaced for a stored image in relation to the start of the reading of a new line.

43 Claims, 4 Drawing Sheets

METHOD FOR THE AUTOMATIC CORRECTION OF ERRORS IN IMAGE REGISTRATION DURING FILM SCANNING

BACKGROUND OF THE INVENTION

The invention pertains to a method for the detection and automatic correction of horizontal or vertical errors in image steadiness during continuous image scanning of films, in accordance with the general definition provided by the main claim.

A substantial disadvantage in the reproduction quality of films on television, as compared to images made with electronic cameras, are the visible horizontal and vertical errors in image steadiness. These partly periodic and partly statistical fluctuations in image position can have several causes. Positioning errors in the film camera or in the negative/positive copy machine, or synchronization errors—flutter and wow—in the film scanner cause problems in image steadiness. Also variations in the dimensions of the perforations in the film stock can have negative effects on steadiness. Even if very tight mechanical tolerances are maintained, the sum of all these errors can cause visible errors in image steadiness on a TV monitor.

The causes, the effects, and the elimination of these errors have been discussed in various publications for a long time, for example Frielinghaus "New Investigations on Picture Steadiness of Motion Pictures in Projection", Journal of the SMPTE, January 1986, page 34 et seq.; Zavada "Challenges to the concept of Cancellation", Journal of the SMPTE, December 1981, page 1173 et seq.; and Wright "Image Steadiness in Television Presentation", Journal of the SMPTE, October 1971, page 812 et seq.

The V.K. patent GB No. 165 417 A describes a method for the measurement and electronic correction of errors in image steadiness. The video signals from a sequence of film images are evaluated using a motion vector measurement of the film image content. However, such a measurement is bound to fail if the image does not provide adequate information, for example: sharp, fixed edges. Also the measurement can produce false results when the camera moves or zooms. The method uses two dimensional interpolators to correct image position without affecting the scanning of the film image. The use of interpolators, however, is expensive and degrades the resolution of the film picture by reason of their two-dimensional low-pass filter effect.

In the V.K. patent GB No. 2 145 899 A a further procedure is described in which the edge of the film image is scanned and is compared to the studio synchronization pulse in order to determine the error in image position. The selection of image storage locations is controlled to correct image position and ongoing scanning is not affected. However, since there are film formats which do not provide a clear frame for the film image and in which film images can even overlap in an unfavorable case, for example in Cinemascope or Super 8 formats, inaccuracies in the determination of position errors can be produced by this method. Besides, different film formats provide different frame sizes. Frame size can change continuously in films. The correction of position by storage location selection also requires an image memory having a storage capacity greater than the total content of the images. Furthermore, the resultant selection, with its variable timing signals, complicates distribution of these timed signals in a studio.

A method for correcting synchronization errors in a film scanner is proposed in the European patent EP No. 0 162 486 A2, wherein tachometer pulses are generated by a toothed roller which is coupled to the film for the control of the horizontal driving frequency of a CCD line sensor array. However, a disadvantage of the method is that the control of the horizontal driving frequency causes changes in the integration time of the CCD and, thus, changes the white-level and the black-level for image elements of the video signal. Compensation of that change is very difficult. Furthermore, the integration effect of the toothed roller, and the motion of each tooth relative to the perforation hole, make quick and precise correction for vertical errors impossible. Finally, no horizontal image steadiness correction is provided by this method.

SUMMARY OF THE INVENTION

Therefore an object of the invention is to provide a method as described above, which avoids the disadvantages described above and which provides an exact correction of the image steadiness in all situations, even for damaged film stock or multi-generational film copies.

This object, as well as other objects which will become apparent from the discussion that follows are achieved, in accordance with the present invention, by a method comprising the steps of:

producing horizontal and vertical image steadiness error signals in dependence upon the horizontal and vertical positions, respectively, of each film frame relative to the television film image scanner;

determining from the vertical error signals the start of scanning of the first television scan line for each film frame as well as the start of writing the video signals produced by scanning that film frame into an image buffer memory;

displacing the start of scanning of each new television scan line relative to the writing of this new scan line into the memory in dependence upon the horizontal error signals;

producing standard television horizontal and vertical timing pulses in synchronism with studio timing pulses; and reading the video signals out from the memory in dependence upon these standard horizontal and vertical timing pulses.

The method in accordance with the present invention has the advantage that horizontal and vertical deviation can be determined at the same time, and a very precise correction is possible. Because of the simultaneous control of the image scanning and memory storage in accordance with the present invention, no increase in storage capacity and no two-dimensional interpolators are necessary. Also, the read out from the image memory is carried out at a fixed frame rate that conforms to studio timing standards and, therefore, is suitable for the distribution in digital studios.

Various other features which will be described below provide advantageous further developments and improvements of the method in accordance with the present invention. The scanning of film markings, preferably sprocket holes scanned at the angle "alpha", is particularly advantageous for detecting horizontal and vertical position errors.

A preferred embodiment of the invention is represented in the drawings and is described in more detail in the following specification.

DESCRIPTION OF THE PREFERRED EMBODIMENT

Figure 1:
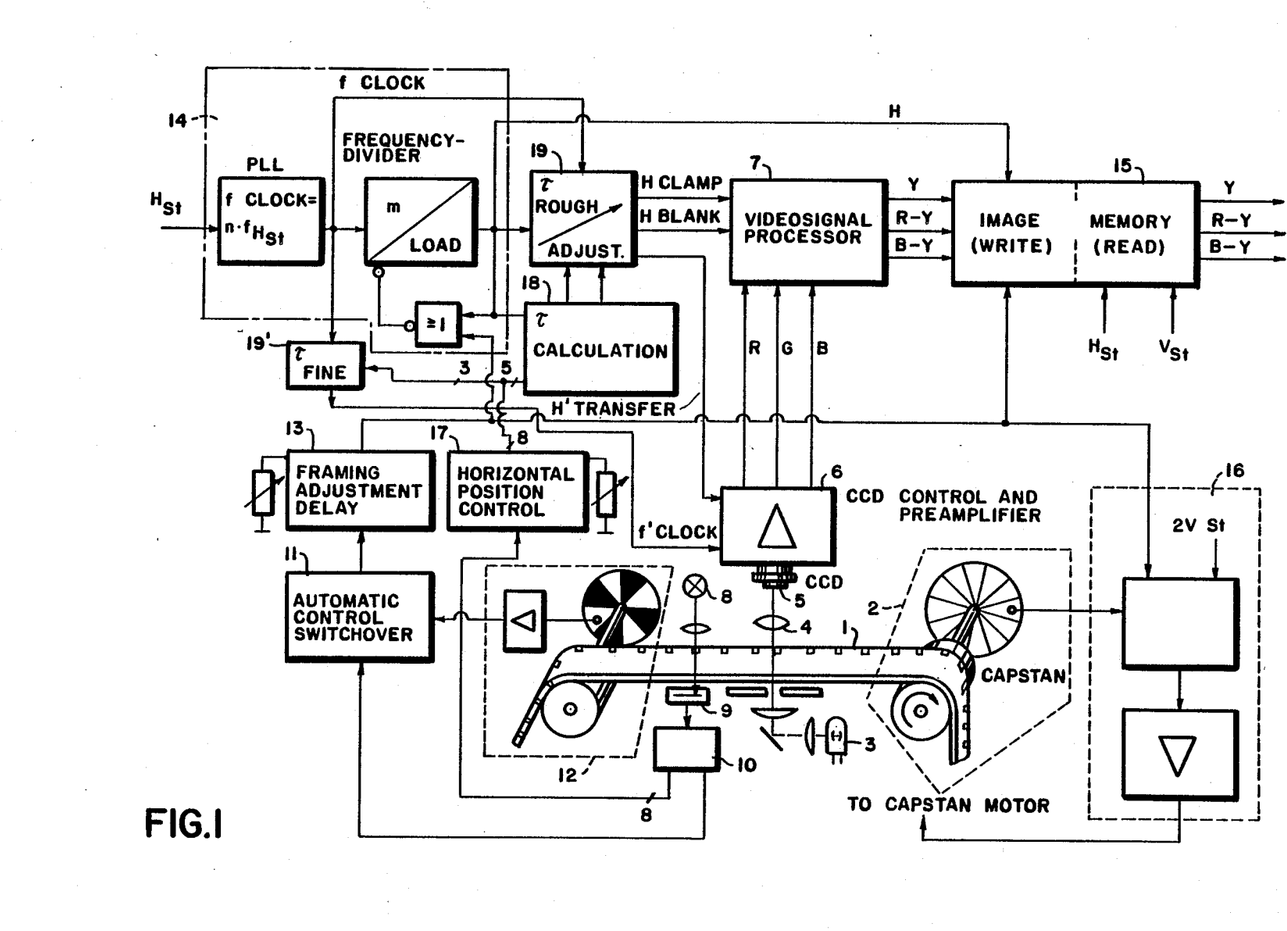
FIG. 1 is a block diagram of a system which employs the automatic correction method in accordance with the present invention.

In the system shown in FIG. 1 the film 1 is driven continuously by a capstan 2, illuminated by a lamp 3, and projected through the lens 4 onto a light-sensitive line sensor array (CCD) 5. Red, green and blue signals from the array are provided by the pre-amplifier 6 to the video signal processor 7.

A clock signal and a horizontal transfer signal are supplied to the pre-amplifier and CCD-unit 6. The horizontal transfer signal determines the start of the scanning of a new line.

A light source 8 illuminates the sprocket hole and projects the image of the sprocket hole onto a linear sensor 9, which is affixed to the scanner at an angle "alpha" to the path of the film, an angle of about 75 degrees. The processing circuit 10, which is shown in more detail in the FIGS. 2 and 4, generates frame-start pulses and horizontal position values from the signal of the light-sensitive line sensor 9.

The frame-start pulses are provided to the switching unit 11, which also receives frame-start pulses from the sprocket tachometer 12. The frame-start pulse from the sprocket hole is gated by the frame-start pulse of the sprocket tachometer so that no ambiguity will be produced when 35 mm film is used, which has 3 or 4 sprocket holes per frame. The timing of the two pulses in relation to each other thus is adjusted and the resulting value is stored. In the event of a breakdown or in the event that the frame-start pulse from the sprocket hole deviates too much, the sprocket tachometer, which is time corrected, is automatically switched in.

The frame-start pulse is delayed for displacement of the frame bar in the framing adjustment unit 13.

A programmable counter provides the delay. The counter is timed by pulses which depend on film speed, so that speed changes do not cause displacement of the position of the picture. The delayed frame-start pulse resets the counter 14, which generates the horizontal-sync signal for the stored image in order to obtain a clear start for the first line in the image memory 15, thus starting the image write cycle in the image memory 15. In addition to this, the frame-start pulses are provided to the capstan servo 16, to correct film speed.

The horizontal sprocket hole position values are determined by the computing circuit 18 through the horizontal position adjustment circuit 17 which generates a horizontal correction value to provide a displacement of the horizontal image position. The computing circuit 18 adjusts the delay unit 19 in accordance with the horizontal correction value. The delay unit 19 provides the horizontal sync pulses required by the scanning unit 6 and the horizontal clamping and blanking pulses required by the video signal processing unit 7.

The delay unit 19 comprises a counter that is driven by the clock signal f clock that is also supplied to the CCD scanning array. The frequency of the clock signal determines the minimum delay. As a further measure, since these increments are not small enough, the clock signal driving the CCD is adjusted in finer steps by a variable analog delay line 19'. As shown in FIG. 1, $f_{clock} = nf_{HSt}$; $f_{H\ transfer} = f_{clock}/m$, where $n=1$.

Figure 2:
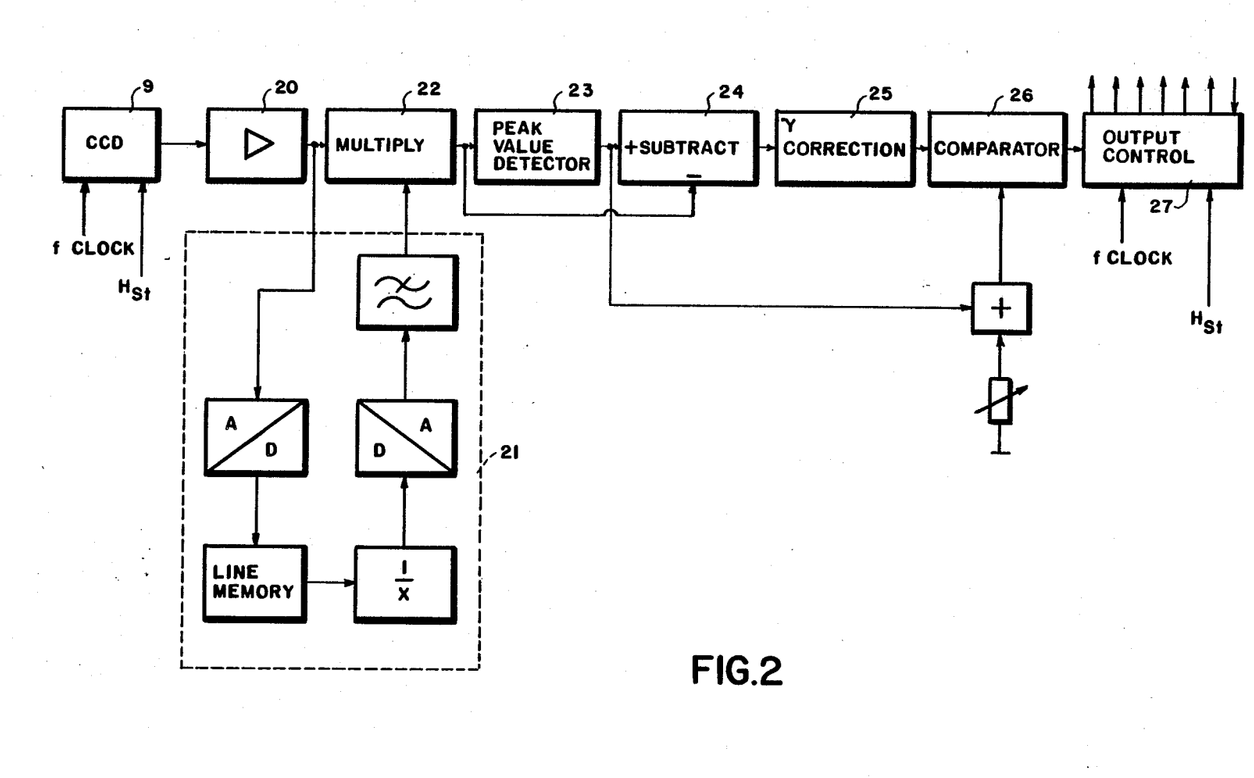
FIG. 2 is a block diagram of the processing of the measurement signals in the system of FIG. 1.

FIG. 2 is a schematic representation of the sprocket hole scanning and signal processing procedure. The measurement signal from the light-sensitive CCD line sensor 9 is provided through an amplifier 20 to a fixed pattern noise compensation unit 21—in this case a multiplicative fixed pattern noise compensation unit, which is known in the art. A multiplier 22 then modifies the input signal using the correction signal produced by the compensation unit 21, thereby providing multiplicative signal compensation for the fixed pattern noise.

The circuit 23 detects the peak values of the measurement signal. The measurement signal is then subtracted in a subtraction circuit 24 from this peak value information. To increase accuracy, the resulting signal is processed by a gamma-correction circuit 25, which expands the signal information in the region close to the peak-values. Comparator 26 generates a digital signal from the gamma-corrected signal, thereby providing an A/D conversion with 1-bit quantization. In order to compensate for light fluctuation, caused for example by aging of the lamp, darkening of the optics or variation in the sensitivity of the line sensor, the peak-values detected by the peak-value circuit 23 are supplied to the comparator 26, to adjust the threshold level of the comparator. The digitalized video signal is then supplied to the output control circuit 27.

The operation of the output control circuit 27, as well as the generation of the frame-start pulses and the horizontal position values, are explained with reference to FIGS. 3 and 4.

Figure 3:
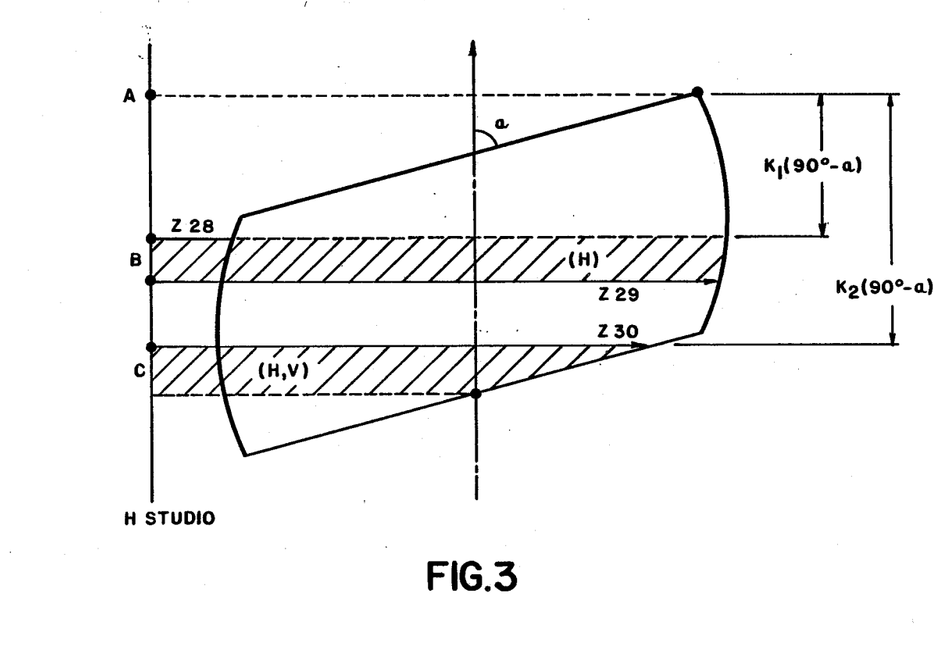
FIG. 3 is a film sprocket hole and indicates the scanning pattern used in accordance with the present invention.
Figure 4:
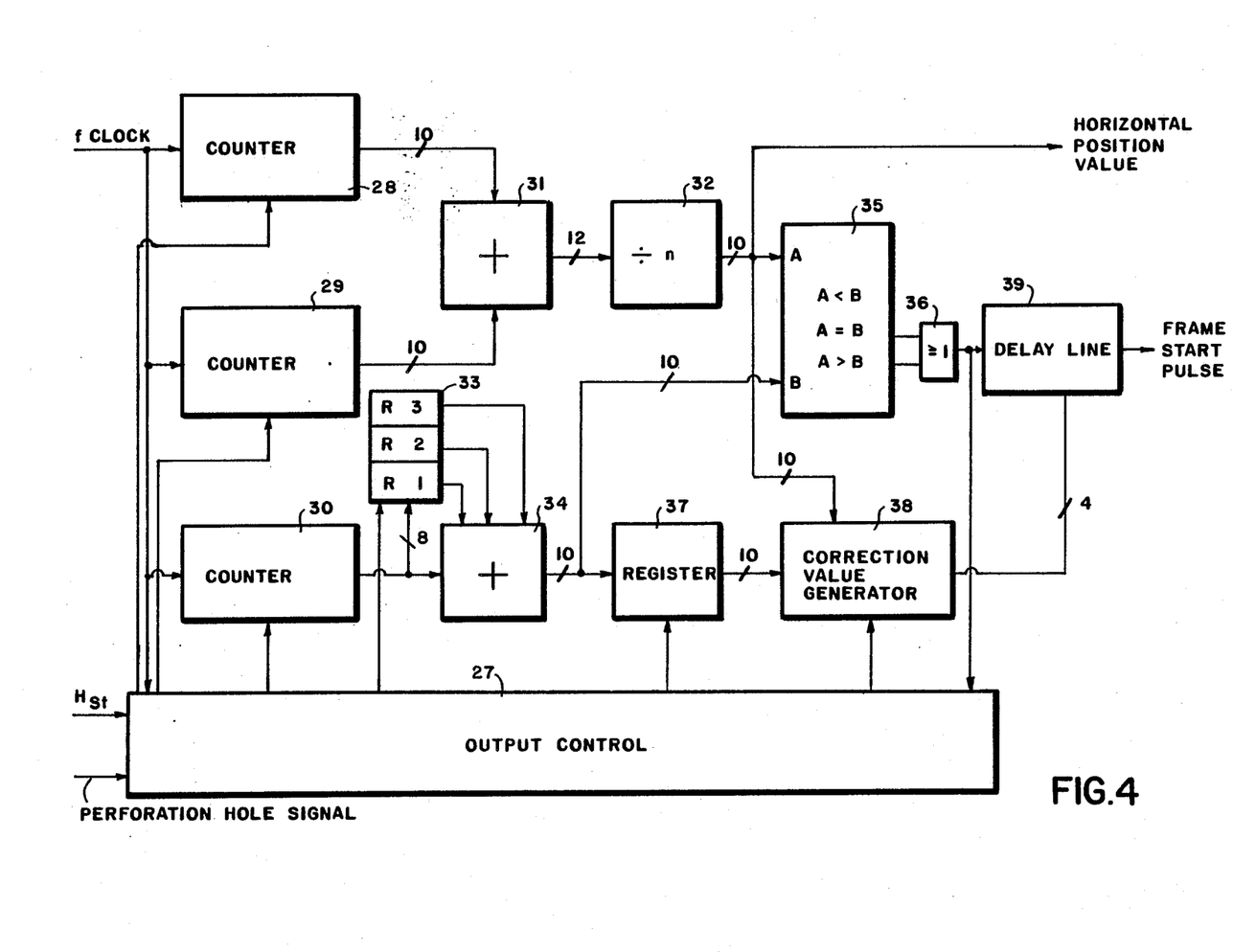
FIG. 4 is a block diagram of the generation of the correction signals in the system of FIG. 1.

FIG. 3 shows the scanned pattern of a so-called "Bell and Howell" sprocket hole. When $K_1 \times (90\ degrees - alpha)$ lines have been output after the edge of the sprocket hole is detected at point A, the counters 28 and 29 FIG. (4) are actuated for several line periods as pointed out at Z28 and Z29 in FIG. 3. In this way counter 28 determines the difference between the left edge of the sprocket hole and a reference pulse, and the counter 29 determines the difference between the right sprocket hole edge and a reference pulse.

To increase the accuracy, the measurements are made over several whole line periods. The result of these measurements is summed by circuit 31 and divided by an integer representing the number of line periods used for the measurement by divider 32. The first signal output by the divider 32 is a horizontal position value which, over time, fluctuates around the value of the horizontal error relative to the reference signal.

When $K_2 \times (90\ degrees - alpha)$ lines after point A have been output, the counter 30 is then actuated for several line periods to determine the value of C.

The value determined by the counter 30 determines the relation between the lower sprocket hole edge and the reference-pulse. The result of this count represents the horizontal and also the vertical error of the picture position.

In a register array 33, several measurement values are stored which are summed by adder 34, in order to determine the average value. The counter 30 counts each of a given number of line periods. The result from adder 34 is provided to the comparator stage 35 which produces a stop-signal through the gate 36 to the output control 27. This stop signal is produced when the measured value output by the adder 34 that has reached the horizontal position value of the center of the hole that was previously calculated, falls below this value.

After an intermediate storage of the measured value in the register 37, the correction value generator 38 determines the difference between the calculated value of the hole-center and the content of the register 37 which is the measured value. A rough vertical correction is provided by using the studio horizontal reference pulse ($H_{St}$) of the next line in the frame for the adjusted frame-start pulse. The output of the comparator 35 at gate 36 provides a rough correction of the vertical position when it detects displacement of the hole center, since the vertical position is quantified by scan lines.

The correction value generator 38 can cause the delay line 39 to produce a delay that displaces the frame-start pulse within the line, for fine-correction.

The delay time ($\Delta t$) is determined by the relation of the difference between the measurement value and the hole center to the difference between the measurement values of subsequent lines multiplied by the duration of one line period ($t_H$), that is:

$$\Delta t = \frac{\text{measurement value}_{Z1} - \text{hole center}}{\text{measurement value}_{Z1} - \text{measurement value}_{Z2}} \times t_H$$

It will be appreciated that the instant specification and claims are set forth by way of illustration and not of limitation, and that various changes and modifications may be made without departing from the spirit and scope of the present invention.

We claim:

1. A method for determining and automatically correcting errors in image steadiness during television image scanning of continuously moving motion picture film having a succession of image frames, said image scanning producing video signals which are temporarily stored in an image buffer memory, said method comprising the steps of:
   (a) producing vertical image steadiness error signals and determining from said vertical error signals the start of scanning of the first television scan line for said film frame as well as the start of writing said video signals for said film frame into said memory in dependence upon the vertical position of a film frame relative to the television image scanner;
   (b) producing studio timing pulses;
   (c) producing standard television horizontal and vertical timing pulses in synchronism with said studio timing pulses; and
   (d) reading said video signals out from said memory in dependence upon said standard horizontal and vertical timing pulses,
   whereby vertical errors in image steadiness are corrected.

2. The method defined in claim 1, further comprising the steps of:
   producing horizontal image steadiness error signals and displacing the start of scanning of a new television scan line relative to the writing of said new scan line into said memory in dependence upon the horizontal position of a film frame relative to the television image scanner,
   whereby horizontal errors in image steadiness are corrected.

3. The method defined in claim 1, further comprising the steps of:
   producing horizontal image steadiness error signals and delaying the video signals before writing them into said memory in relation to said horizontal error signals during the simultaneous beginning of scanning and writing of a new scan line into said memory, in dependence upon the horizontal position of a film frame relative to the television image scanner,
   whereby horizontal errors in image steadiness are corrected.

4. The method defined in either one of claims 2 or 3, further comprising the steps of producing frame-start pulses and horizontal position values in dependence upon at least one of said horizontal and vertical error signals.

5. The method defined in claim 4, wherein said frame-start pulses are released during only a portion of the period of scanning of a film frame, and are blocked during the remainder of said scanning period.

6. The method defined in claim 5, further comprising the step of determining said portions of said scanning period during which said frame-start pulses are released and blocked, respectively, by engaging perforations in said film without slippage.

7. The method defined in claim 6, wherein said engaging step includes the step of engaging a sprocket in said perforations.

8. The method defined in claim 7, further comprising the steps of:
   generating substitute pulses with a tachometer driven by said sprocket and automatically providing said substitute pulses when said frame-start pulses are missing during the portion of said scanning period during which said frame-start pulses are to be released.

9. The method defined in claim 4, further comprising the step of delaying said frame-start pulses for an adjustable period of time to correct vertical framing of the scan image.

10. The method defined in claim 9, wherein said film is continuously driven past the television image scanner by a capstan, said method further comprising the step of controlling the phase of said film drive capstan in dependence upon the delayed frame-start pulses.

11. The method defined in claim 4, further comprising the step of modifying the horizontal position value by an adjustable value to shift the video signal in the horizontal direction.

12. The method defined in claim 11, further comprising the steps of providing horizontal scanning, clamping and blanking pulses, and time shifting said horizontal scanning, clamping and blanking pulses in dependence upon said modified horizontal position value.

13. The method defined in claim 4, further comprising the step of imaging said film at an angle "alpha" with respect to the path of motion of said film on a pickup device, thereby to determine both horizontal and vertical image steadiness errors and to produce said horizontal and vertical error signals.

14. The method defined in claim 13, wherein said step of imaging said film at said angle alpha on a pickup device includes the steps of:

imaging a mark which appears with each film frame on least one light sensitive linear sensor; and generating a measurement signal, thereby to detect said horizontal and vertical errors in image steadiness.

15. The method defined in claim 14, wherein said mark is a sprocket hole.

16. The method defined in claim 13, wherein said angle alpha is approximately 75°.

17. The method defined in claim 14, further comprising the steps of:

producing a horizontal timing signal having a horizonal frequency which is n times the frequency of said studio timing pulses, where n is equal to or greater than 1; and driving said linear sensor, in dependence upon said horizontal timing signal, at said horizontal frequency.

18. The method defined in claim 15, further comprising the step of compensating for variations in the response of said linear sensor due to variations in the lighting of the sprocket hole, variations in the transmissivity of the optics and variations in the linear sensor sensitivity.

19. The method defined in claim 18, wherein said compensating step includes the step of multiplicative shading and structure correction.

20. The method defined in claim 19, further comprising the step of converting said measurement signal to successive digital values, after subtracting the measurement signal from the peak value thereof, thereby to provide a reliable switching threshold for the analog to digital conversion of the measurement signal in-dependent of light variations in said linear sensor.

21. The method defined in claim 20, further comprising the step of non-linearally expanding said measurement signal, thereby to further improve the reliability of the switching threshold for the analog to digital conversion.

22. The method defined in claim 21, wherein said expanding step includes the step of expanding said measurement signal the greatest amount when said measurement signal is at a maximum, and expanding said measurement signal the smallest amount when said measurement signal is at a minimum.

23. The method defined in claim 18, further comprising the step of producing a 1-bit combined horizontal and vertical error signal from said measurement signal by means of said analog to digital conversion using an adjustable switching threshold.

24. The method defined in claim 23, further comprising the step of shifting said switching threshold of said measurement signal in dependence upon the peak value of said measurement signal, thereby to determine a reliable switching threshold independent of light variations in said linear sensor.

25. The method defined in claim 4, further comprising the steps of scanning a first measurement region of said sprocket hole (B) in which only horizontal image steadiness errors are measured, and scanning a second measurement region (C) of said sprocket hole in which both horizontal and vertical image steadiness errors are measured, thereby to separate the vertical error measurement from the horizontal error measurement.

26. The method defined in claim 25, wherein said first measurement region (B) starts after a first constant ($K_1$) times (90 degrees minus a prescribed angle "alpha") lines following the first scan line (A) of said sprocket hole which produces said measurement signal.

27. The method defined in claim 25, further comprising the step of determining the position of the center of said sprocket hole by determining the distances from a reference, located outside of said sprocket hole, to the left side edge and the right side edge of said hole, and by halving the sum of said distances.

28. The method defined in claim 27, wherein said position of the center of said sprocket hole is determined for several successive scan lines, thereby to compensate errors.

29. The method defined in claim 27, wherein said horizontal correction value is produced by determining the difference between the actual and target positions of said center of said sprocket hole.

30. The method defined in claim 25, wherein said second measurement region (C) starts after a second constant ($K_2$) times (90 degrees minus a prescribed angle "alpha") lines following the first scan line (A) of said sprocket hole which produces said measurement signal.

31. The method defined in claim 30, wherein said steps of scanning said first measurement region (B) and said second measurement region (C) include the steps of:

scanning said sprocket hole for several sequential lines; and dividing the total sum of the distances between a reference and the upper or lower edges of said sprocket hole by the number of measured lines, thereby to reduce errors in the measurements.

32. The method defined in claim 25, wherein the result of the measurement in said first measurement region (B) is compared to the result of the measurement in said second measurement region (C), thereby to separate said vertical error measurement from said horizontal error measurement.

33. The method defined in claim 32, further comprising the steps of:

determining the position of the center of said sprocket hole in said second measurement region (C); and after a first displacement of said sprocket hole center is detected in said second measurement region (C), determining the difference between the measured and target positions of said sprocket hole center.

34. The method defined in claim 33, wherein said studio timing pulses include a horizontal reference pulse ($H_{st}$), said method further comprising the step of using said horizontal reference pulse of the next line as a frame-start pulse to provide a rough vertical correction after the first displacement of said sprocket hole center is detected during measurement in said second measurement region (C).

35. The method defined in claim 34, wherein said horizontal reference pulse is delayed by a delay time ($\Delta t$) to produce said frame-start pulse, thereby to provide a fine vertical correction.

36. The method defined in claim 35, wherein said delay time ($\Delta t$) is determined from the ratio of the difference between the measurement value and the sprocket hole center to the difference between the measurement values of subsequent lines multiplied by the duration of the period of one line ($t_H$), in accordance with the formula:

$$t = \frac{\text{measurement value}_{Z1} - \text{hole center}}{\text{measurement value}_{Z1} - \text{measurement value}_{Z2}} \times t_H.$$

wherein said measurement values Z1 and Z2 are taken at successive lines.

37. The method defined in claim 15, wherein said step of scanning a sprocket hole includes the steps of:
scanning each sprocket hole of said film; and
adjusting the image scanning horizontal line frequency to eliminate dynamic position errors, such as those errors resulting from splices in films having several sprocket holes per frame.

38. The method defined in claim 37, wherein light sensitive linear sensors are used for said television image scanning, and wherein the amplitude of said video signals is made independent of variations in said horizontal line frequency.

39. Apparatus for television image scanning of perforated motion picture film having a succession of image frames and at least one reference mark associated with each frame, said apparatus comprising:
(a) servo drive means, including a capstan, for continuously moving said film past an image scanning location;
(b) scanning means, at said image scanning location, for scanning the image frames of said film and producing video signals in response thereto;
(c) memory means, having a start input, for temporarily storing video signals;
(d) means, disposed immediately adjacent said image scanning location, for scanning said reference marks on said film and producing scan output signals in response thereto;
(e) signal processing means, coupled to receive said scan output signals, for producing frame-start pulses and horizontal position value signals;
(f) tachometer means, arranged to engage the film perforations, for producing film position signals;
(g) control and switchover means, coupled to receive said frame-start pulses and said film position signals, for producing vertical control signals, said vertical control signals being supplied to said servo drive means for controlling the film motion speed;
(h) first delay circuit means, coupled to receive said vertical control signals, for adjusting the film scan line with respect to the start input of said memory means;
(i) horizontal position control means, coupled to receive said horizontal position value signals, for producing horizontal control signals;
(j) phase lock circuit means, responsively timed by said frame-start pulses, for producing a frequency signal;
(k) second delay circuit means having two inputs and being coupled at one input to said horizontal position control means and at the other input to said phase lock circuit means, for producing horizontal frequency signals;
(l) preamplifier means, coupled to said scanning means and to said second delay circuit means, for amplifying said video signals in synchronism with said horizontal frequency signals;
(m) video processor means, coupled to said preamplifier means and to said second delay circuit means, for processing the amplified video signals in response to said horizontal frequency signals, said video processor means producing output video signals which are supplied to said memory means, whereby video signals may be read from said memory means with horizontal and vertical synchronization in synchronism with studio timing pulses.

40. The apparatus defined in claim 39, wherein said signal processing means comprises:
(1) amplifier means, for amplifying said scan output signals;
(2) noise compensation circuit means, coupled to said amplifier means, for producing a noise correction signal;
(3) multiplier circuit means, coupled to said amplifier means and to said noise compensation circuit means, for producing a noise corrected measurement signal in response to said amplified scan output signal and said noise correction signal;
(4) peak value detector means, coupled to said multiplier circuit means, for producing a peak value signal from said measurement signal;
(5) subtraction circuit means, coupled to said multiplier circuit means and said peak value detector means, for producing a signal representative of said measurement signal subtracted from said peak value signal;
(6) non-linear correction circuit means, coupled to said subtraction circuit means, for non-linearly expanding the output of said subtraction circuit means;
(7) comparator circuit means, coupled to said peak value detector means and said non-linear correction circuit means, producing an output in response to said peak value signal and said non-linerally expanded measurement signal; and
(8) output control circuit means, responsive to said studio horizontal synchronization pulses and to said output of said comparator circuit means for producing said frame-start pulses and said horizontal position value signals.

41. The apparatus defined in claim 40, wherein said reference mark associated with each film frame is a sprocket hole, and wherein said output control circuit means comprises:
(i) first counter means for determining the difference between a reference and the left-edge of the sprocket hole to be measured;
(ii) second counter means for determining the difference between said reference and the right-edge of the sprocket hole to be measured; and
(iii) first addition circuit means, coupled to said first and second counter means, for producing a horizontal position value signal representing the sum of the counts contained in said first and second counter means.

42. The apparatus defined in claim 41, wherein said output control circuit means further comprises divider circuit means, coupled to the output of said first addition circuit means, for dividing said horizontal position value by the sum of the measuring periods.

43. The apparatus defined in claim 41, wherein said output control circuit means further comprises:
(iv) third counter means for determining the position of the lower edge of said sprocket hole with respect to said reference;
(v) first register means, coupled to the output of said third counter means, for storing a plurality of values determined by said third counter means;

(vi) second addition circuit means, coupled to said register means, for adding together the values stored in said register means;

(vii) comparator means, coupled to the outputs of said first and second addition circuit means for producing a stop signal in dependence upon the relative magnitudes of the inputs thereto;

(viii) second register means, coupled to said second addition means, for temporarily storing the output of said second addition means;

(ix) correction value generator means, coupled to said second register means and said first addition means, for producing a start signal; and (x) third delay circuit means, coupled to said comparator means and to said correction value generator means for producing a frame-start pulse in response to said stop signal and said start signal, respectively.

* * * * *